US008460090B1

(12) United States Patent
Gilliland

(10) Patent No.: US 8,460,090 B1
(45) Date of Patent: Jun. 11, 2013

(54) GAMING SYSTEM, GAMING DEVICE, AND METHOD PROVIDING AN ESTIMATED EMOTIONAL STATE OF A PLAYER BASED ON THE OCCURRENCE OF ONE OR MORE DESIGNATED EVENTS

(75) Inventor: Sean M. Gilliland, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/354,709

(22) Filed: Jan. 20, 2012

(51) Int. Cl.
*A63F 9/24* (2006.01)
*A63F 13/00* (2006.01)

(52) U.S. Cl.
USPC .................. 463/23; 463/16; 463/17; 463/18; 463/19; 463/20; 463/25

(58) Field of Classification Search
USPC .......................................... 463/16–20, 23, 25
See application file for complete search history.

(56) References Cited

U.S. PATENT DOCUMENTS

| | | | |
|---|---|---|---|
| 3,129,004 | A | 4/1964 | Ritzler |
| 3,468,476 | A | 9/1969 | Keegan |
| 3,831,172 | A | 8/1974 | Olliges et al. |
| 4,300,225 | A | 11/1981 | Lambl |
| 4,314,236 | A | 2/1982 | Mayer et al. |
| 4,339,798 | A | 7/1982 | Hedges et al. |
| 4,344,345 | A | 8/1982 | Sano |
| 4,363,482 | A | 12/1982 | Goldfarb |
| RE31,441 | E | 11/1983 | Nutting et al. |
| 4,496,149 | A | 1/1985 | Schwartzberg |
| 4,582,324 | A | 4/1986 | Koza et al. |
| 4,592,546 | A | 6/1986 | Fascenda et al. |
| 4,618,150 | A | 10/1986 | Kimura |
| 4,624,459 | A | 11/1986 | Kaufman |
| 4,660,107 | A | 4/1987 | Chippendale, Jr. |
| 4,695,053 | A | 9/1987 | Vazquez, Jr. et al. |
| 4,712,189 | A | 12/1987 | Mohri |
| 4,732,386 | A | 3/1988 | Rayfiel |
| 4,733,593 | A | 3/1988 | Rothbart |
| 4,791,558 | A | 12/1988 | Chaitin et al. |
| 4,815,741 | A | 3/1989 | Small |
| 4,854,590 | A | 8/1989 | Jolliff et al. |
| 4,869,500 | A | 9/1989 | Williams |
| 4,876,937 | A | 10/1989 | Suzuki |

(Continued)

FOREIGN PATENT DOCUMENTS

| | | |
|---|---|---|
| WO | WO 00/75824 | 12/2000 |
| WO | WO 01/69512 | 9/2001 |

(Continued)

*Primary Examiner* — Arthur O. Hall
*Assistant Examiner* — Jasson Yoo
(74) *Attorney, Agent, or Firm* — Neal, Gerber & Eisenberg LLP

(57) ABSTRACT

The present disclosure provides gaming systems, gaming devices, and methods providing an estimated emotional state of a player based on the occurrence of one or more designated events. When a player initiates a gaming session, the gaming system estimates the player's emotional state and generates estimated emotional state data that represents that estimation of the player's emotional state. For each of one or more designated events that occurs, the gaming system updates the player's estimated emotional state using an expected emotional response to that designated event. More specifically, the gaming system updates the player's estimated emotional state data using expected emotional response data representing the expected emotional response to that designated event. If one or more triggering conditions associated with the player's estimated emotional state is satisfied during the gaming session, the gaming system modifies one or more functions, aspects, or features of the gaming system.

20 Claims, 8 Drawing Sheets

U.S. PATENT DOCUMENTS 4,890,842 A 1/1990 Plange
4,930,789 A 6/1990 Harris et al.
4,961,575 A 10/1990 Perry
4,974,483 A 12/1990 Luzzatto
4,974,857 A 12/1990 Beall et al.
4,982,346 A 1/1991 Girouard et al.
5,046,735 A 9/1991 Hamano et al.
5,057,915 A 10/1991 Von Kohorn
5,076,613 A 12/1991 Kovacs
5,080,364 A 1/1992 Seidman
5,096,195 A 3/1992 Gimmon
5,099,232 A 3/1992 Howes
5,119,465 A 6/1992 Jack
5,137,278 A 8/1992 Schilling et al.
5,179,517 A 1/1993 Sarbin et al.
5,221,801 A 6/1993 Bruti et al.
5,223,828 A 6/1993 McKiel, Jr.
5,231,578 A 7/1993 Cohen et al.
5,242,163 A 9/1993 Fulton
5,258,574 A 11/1993 Kawano
5,266,736 A 11/1993 Saito
5,269,522 A 12/1993 Chagoll et al.
5,275,400 A 1/1994 Weingardt et al.
5,287,102 A 2/1994 McKiel, Jr.
5,331,112 A 7/1994 Sato et al.
5,342,047 A 8/1994 Heidel et al.
5,362,051 A 11/1994 Swafford, Jr. et al.
5,365,110 A * 11/1994 Matsuoka .................... 257/762
5,371,345 A 12/1994 LeStrange et al.
5,373,440 A 12/1994 Cohen et al.
5,390,938 A 2/1995 Takeya
5,392,066 A 2/1995 Fisher et al.
5,393,061 A 2/1995 Manship et al.
5,393,070 A 2/1995 Best
5,429,507 A 7/1995 Kaplan
5,429,513 A 7/1995 Diaz-Plaza
5,430,835 A 7/1995 Williams et al.
5,446,902 A 8/1995 Islam
5,449,173 A 9/1995 Thomas et al.
5,469,511 A 11/1995 Lewis et al.
5,470,233 A 11/1995 Fruchterman et al.
5,472,197 A 12/1995 Gwiasda et al.
5,508,699 A 4/1996 Silverman
5,515,764 A 5/1996 Rosen
5,538,252 A 7/1996 Green
5,551,692 A 9/1996 Pettit et al.
5,555,991 A 9/1996 Hart
5,570,885 A 11/1996 Ornstein
5,577,253 A 11/1996 Blickstein
5,606,144 A 2/1997 Dabby
5,620,182 A 4/1997 Rossides
5,625,845 A 4/1997 Allran
5,630,754 A 5/1997 Rebane
5,643,088 A 7/1997 Vaughn et al.
5,668,996 A 9/1997 Radinsky
5,695,188 A 12/1997 Ishibashi
5,695,402 A 12/1997 Stupak
5,697,843 A 12/1997 Manship et al.
5,697,844 A 12/1997 Von Kohorn
5,703,310 A 12/1997 Kurakake et al.
5,707,286 A 1/1998 Carlson
5,715,459 A 2/1998 Celi
5,718,431 A 2/1998 Ornstein
5,722,890 A 3/1998 Libby et al.
5,745,761 A 4/1998 Celi
5,745,762 A 4/1998 Celi
5,758,875 A 6/1998 Giacalone, Jr.
5,762,552 A 6/1998 Vuong et al.
5,766,074 A 6/1998 Cannon et al.
5,772,509 A 6/1998 Weiss
5,778,231 A 7/1998 Van Hoff
5,788,574 A 8/1998 Ornstein et al.
5,791,991 A 8/1998 Small
5,792,972 A 8/1998 Houston
5,802,364 A 9/1998 Senator
5,806,852 A 9/1998 Howes
5,807,172 A 9/1998 Piechowiak
5,809,303 A 9/1998 Senator
5,812,688 A 9/1998 Gibson
5,813,913 A 9/1998 Berner et al.
5,816,918 A 10/1998 Kelly et al.
5,829,748 A 11/1998 Moore, Jr.
5,833,538 A 11/1998 Weiss
5,839,958 A 11/1998 Ozarow
5,848,932 A 12/1998 Adams
5,848,936 A 12/1998 Morrison
5,851,147 A 12/1998 Stupak et al.
5,854,927 A 12/1998 Gelissen
5,857,175 A 1/1999 Day et al.
5,876,284 A 3/1999 Acres et al.
5,880,386 A 3/1999 Wachi et al.
5,883,620 A 3/1999 Hobbs et al.
5,889,990 A 3/1999 Coleman
5,892,171 A 4/1999 Ide
5,902,184 A 5/1999 Bennett et al.
5,908,354 A 6/1999 Okuniewicz
5,910,048 A 6/1999 Feinberg
5,911,071 A 6/1999 Jordan
5,918,211 A 6/1999 Sloane
5,920,720 A 7/1999 Toutonghi
5,920,842 A 7/1999 Cooper et al.
5,923,878 A 7/1999 Marsland
5,923,880 A 7/1999 Rose
5,928,082 A 7/1999 Clapper, Jr.
5,930,509 A 7/1999 Yates
5,933,811 A 8/1999 Angles et al.
5,933,813 A 8/1999 Teicher et al.
5,937,193 A 8/1999 Evoy
5,941,772 A 8/1999 Paige
5,946,487 A 8/1999 Dangelo
5,946,489 A 8/1999 Yellin
5,946,646 A 8/1999 Schena et al.
5,946,664 A 8/1999 Ebisawa
5,950,173 A 9/1999 Perkowski
5,962,831 A 10/1999 Byrley
5,964,843 A 10/1999 Eisler et al.
5,966,535 A 10/1999 Benedikt
5,967,894 A 10/1999 Kinoshita et al.
5,970,249 A 10/1999 Holze
5,978,585 A 11/1999 Crelier
5,979,757 A 11/1999 Tracy et al.
5,991,736 A 11/1999 Ferguson et al.
5,997,401 A 12/1999 Crawford
5,999,731 A 12/1999 Yellin
6,003,038 A 12/1999 Chen
6,006,257 A 12/1999 Slezak
6,007,426 A 12/1999 Kelly et al.
6,009,410 A 12/1999 LeMole et al.
6,009,412 A 12/1999 Storey
6,015,344 A 1/2000 Kelly et al.
6,015,346 A 1/2000 Bennett
D421,277 S 2/2000 McGahn et al.
6,021,272 A 2/2000 Cahill
6,021,273 A 2/2000 Criesemer
6,024,642 A 2/2000 Stupak
6,026,238 A 2/2000 Bond
6,029,000 A 2/2000 Woolsey
6,031,993 A 2/2000 Andrews
6,035,120 A 3/2000 Ravichandran
6,036,601 A 3/2000 Heckel
6,039,648 A 3/2000 Guinn et al.
6,048,268 A 4/2000 Humble
6,052,527 A 4/2000 Delcourt et al.
6,056,642 A 5/2000 Bennett
6,062,979 A 5/2000 Inoue
6,066,181 A 5/2000 DeMaster
6,071,192 A 6/2000 Weiss
6,074,432 A 6/2000 Guccione
6,075,940 A 6/2000 Gosling
6,079,985 A 6/2000 Wohl et al.
6,084,169 A 7/2000 Hasegawa et al.
6,089,976 A 7/2000 Schneider et al.
6,089,978 A 7/2000 Adams
6,092,147 A 7/2000 Levy
6,096,095 A 8/2000 Halstead
6,102,400 A 8/2000 Scott et al.
6,102,799 A 8/2000 Stupak

| | | | |
|---|---|---|---|
| 6,103,964 | A | 8/2000 | Kay |
| 6,106,393 | A | 8/2000 | Sunaga et al. |
| 6,109,612 | A | 8/2000 | Moore |
| 6,110,041 | A | 8/2000 | Walker et al. |
| 6,110,043 | A | 8/2000 | Olsen |
| 6,110,226 | A | 8/2000 | Bothner |
| 6,113,495 | A | 9/2000 | Walker |
| 6,117,009 | A | 9/2000 | Yoseloff |
| 6,126,165 | A | 10/2000 | Sakamoto |
| 6,131,191 | A | 10/2000 | Cierniak |
| 6,138,273 | A | 10/2000 | Sturges |
| 6,141,006 | A | 10/2000 | Knowlton et al. |
| 6,141,794 | A | 10/2000 | Dice |
| 6,142,875 | A | 11/2000 | Kodachi et al. |
| 6,146,273 | A | 11/2000 | Olsen |
| 6,146,276 | A | 11/2000 | Okuniewicz |
| 6,155,925 | A | 12/2000 | Giobbi et al. |
| 6,159,097 | A | 12/2000 | Gura |
| 6,165,070 | A | 12/2000 | Nolte et al. |
| 6,173,267 | B1 | 1/2001 | Cairns |
| 6,174,233 | B1 | 1/2001 | Sunaga et al. |
| 6,174,235 | B1 | 1/2001 | Walker et al. |
| 6,175,632 | B1 | 1/2001 | Marx |
| 6,183,366 | B1 | 2/2001 | Goldberg |
| 6,186,893 | B1 | 2/2001 | Walker et al. |
| 6,186,894 | B1 | 2/2001 | Mayeroff |
| 6,196,920 | B1 | 3/2001 | Spaur et al. |
| 6,198,395 | B1 | 3/2001 | Sussman |
| 6,213,874 | B1 | 4/2001 | Heflin |
| 6,217,448 | B1 | 4/2001 | Olsen |
| 6,224,482 | B1 | 5/2001 | Bennet |
| 6,233,731 | B1 | 5/2001 | Bond et al. |
| 6,234,897 | B1 | 5/2001 | Frohm et al. |
| 6,238,288 | B1 | 5/2001 | Walker et al. |
| 6,241,612 | B1 | 6/2001 | Heredia |
| 6,254,481 | B1 | 7/2001 | Jaffe |
| 6,267,672 | B1 | 7/2001 | Vance |
| 6,267,675 | B1 | 7/2001 | Lee |
| 6,270,409 | B1 | 8/2001 | Shuster |
| 6,270,411 | B1 | 8/2001 | Gura et al. |
| 6,293,864 | B1 | 9/2001 | Romero |
| 6,293,869 | B1 | 9/2001 | Kwan et al. |
| 6,295,638 | B1 | 9/2001 | Brown et al. |
| 6,299,531 | B1 | 10/2001 | Bommarito |
| 6,302,790 | B1 | 10/2001 | Brossard |
| 6,306,034 | B1 | 10/2001 | Sakamoto et al. |
| 6,306,035 | B1 | 10/2001 | Kelly et al. |
| 6,309,299 | B1 | 10/2001 | Weiss |
| 6,309,301 | B1 | 10/2001 | Sano |
| 6,311,982 | B1 | 11/2001 | Lebensfeld et al. |
| 6,321,323 | B1 | 11/2001 | Nugroho et al. |
| 6,322,309 | B1 | 11/2001 | Thomas et al. |
| 6,324,519 | B1 | 11/2001 | Eldering |
| 6,328,648 | B1 | 12/2001 | Walker et al. |
| RE37,588 | E | 3/2002 | Ornstein |
| 6,379,251 | B1 | 4/2002 | Auxier et al. |
| 6,381,626 | B1 | 4/2002 | DeLeo et al. |
| 6,390,917 | B1 | 5/2002 | Walker et al. |
| 6,390,923 | B1 | 5/2002 | Yoshitomi et al. |
| 6,409,596 | B1 | 6/2002 | Hayashida et al. |
| 6,416,411 | B1 | 7/2002 | Tsukahara |
| 6,443,843 | B1 | 9/2002 | Walker et al. |
| 6,447,395 | B1 | 9/2002 | Stevens |
| 6,454,649 | B1 | 9/2002 | Mattice et al. |
| 6,484,148 | B1 | 11/2002 | Boyd |
| 6,504,089 | B1 | 1/2003 | Negishi et al. |
| 6,516,466 | B1 | 2/2003 | Jackson |
| 6,523,824 | B1 | 2/2003 | Colapinto et al. |
| 6,537,152 | B2 | 3/2003 | Seelig et al. |
| 6,540,609 | B1 | 4/2003 | Paige |
| 6,544,122 | B2 | 4/2003 | Araki et al. |
| 6,554,703 | B1 | 4/2003 | Bussick et al. |
| 6,561,908 | B1 | 5/2003 | Hoke |
| 6,567,786 | B1 | 5/2003 | Bibelnieks et al. |
| 6,567,842 | B2 | 5/2003 | DeLeo et al. |
| 6,582,302 | B2 | 6/2003 | Romero |
| 6,585,586 | B1 | 7/2003 | Romero |
| 6,585,588 | B2 | 7/2003 | Hartl |
| 6,595,859 | B2 | 7/2003 | Lynn |
| 6,599,195 | B1 | 7/2003 | Araki et al. |
| 6,606,745 | B2 | 8/2003 | Maggio |
| 6,609,969 | B1 | 8/2003 | Luciano et al. |
| 6,616,533 | B1 | 9/2003 | Rashkovskiy |
| 6,625,578 | B2 | 9/2003 | Spaur et al. |
| 6,633,850 | B1 | 10/2003 | Gabbard et al. |
| 6,634,550 | B1 | 10/2003 | Walker et al. |
| 6,638,169 | B2 | 10/2003 | Wilder et al. |
| 6,645,068 | B1 | 11/2003 | Pham et al. |
| 6,656,046 | B1 | 12/2003 | Yoseloff et al. |
| 6,656,050 | B2 | 12/2003 | Busch et al. |
| 6,679,492 | B2 | 1/2004 | Markowiak |
| 6,712,702 | B2 | 3/2004 | Goldberg et al. |
| 6,729,618 | B1 | 5/2004 | Koenig et al. |
| 6,729,884 | B1 | 5/2004 | Kelton et al. |
| 6,739,973 | B1 | 5/2004 | Lucchesi et al. |
| 6,749,504 | B2 | 6/2004 | Hughs-Baird |
| 6,749,511 | B2 | 6/2004 | Day |
| 6,764,395 | B1 | 7/2004 | Guyett |
| 6,769,985 | B1 | 8/2004 | Laakso et al. |
| 6,786,824 | B2 | 9/2004 | Cannon |
| 6,790,142 | B2 | 9/2004 | Okada et al. |
| 6,805,628 | B2 | 10/2004 | Romero |
| 6,810,517 | B2 | 10/2004 | Bond et al. |
| 6,834,856 | B2 | 12/2004 | Wilson |
| 6,848,996 | B2 | 2/2005 | Hecht et al. |
| 6,882,978 | B2 | 4/2005 | Ebisawa |
| 6,885,995 | B2 | 4/2005 | Bell et al. |
| 6,887,157 | B2 | 5/2005 | Lemay et al. |
| 6,890,256 | B2 | 5/2005 | Walker et al. |
| 6,896,614 | B2 | 5/2005 | Romero |
| 6,899,626 | B1 | 5/2005 | Luciano et al. |
| 6,907,400 | B1 | 6/2005 | Matsko et al. |
| 6,912,504 | B1 | 6/2005 | Rashkovskiy |
| 6,928,414 | B1 | 8/2005 | Kim |
| 6,935,955 | B1 | 8/2005 | Kaminkow et al. |
| 6,966,836 | B1 | 11/2005 | Rush et al. |
| 7,025,674 | B2 | 4/2006 | Adams et al. |
| 7,038,637 | B1 | 5/2006 | Eller et al. |
| 7,052,392 | B2 | 5/2006 | Tessmer et al. |
| 7,054,831 | B2 | 5/2006 | Koenig |
| 7,056,208 | B2 | 6/2006 | Cogert |
| 7,076,445 | B1 | 7/2006 | Cartwright |
| 7,085,733 | B2 | 8/2006 | Ebisawa |
| 7,094,149 | B2 | 8/2006 | Walker et al. |
| 7,105,736 | B2 | 9/2006 | Laakso |
| 7,111,845 | B2 | 9/2006 | Walker et al. |
| 7,139,725 | B1 | 11/2006 | Moyerson |
| 7,168,617 | B2 | 1/2007 | Walker et al. |
| 7,258,613 | B2 | 8/2007 | Lucchesi et al. |
| 7,355,112 | B2 | 4/2008 | Laakso |
| 7,455,586 | B2 | 11/2008 | Nguyen et al. |
| 7,485,040 | B2 | 2/2009 | Walker et al. |
| 7,585,222 | B2 | 9/2009 | Muir |
| 7,771,271 | B2 | 8/2010 | Walker et al. |
| 7,878,901 | B2 | 2/2011 | Walker et al. |
| 7,918,736 | B2 | 4/2011 | Walker et al. |
| 7,955,172 | B2 | 6/2011 | Walker et al. |
| 7,963,844 | B2 | 6/2011 | Walker et al. |
| 7,993,198 | B2 | 8/2011 | Walker et al. |
| 7,997,972 | B2 | 8/2011 | Nguyen et al. |
| 8,016,674 | B2 | 9/2011 | Lucchesi et al. |
| 2001/0028147 | A1 | 10/2001 | Ornstein et al. |
| 2001/0029200 | A1 | 10/2001 | Romero |
| 2001/0029542 | A1 | 10/2001 | Nishimura |
| 2001/0041609 | A1 | 11/2001 | Oranges et al. |
| 2002/0002070 | A1 | 1/2002 | Romero |
| 2002/0006820 | A1 | 1/2002 | Romero |
| 2002/0039923 | A1 | 4/2002 | Cannon et al. |
| 2002/0077165 | A1 | 6/2002 | Bansemer et al. |
| 2002/0077169 | A1 | 6/2002 | Kelly et al. |
| 2002/0090990 | A1 | 7/2002 | Koenig et al. |
| 2002/0096827 | A1 | 7/2002 | Markowiak |
| 2002/0109718 | A1 | 8/2002 | Mansour et al. |
| 2002/0137558 | A1 | 9/2002 | Hartl |
| 2002/0155870 | A1 | 10/2002 | Romero |
| 2002/0155877 | A1 | 10/2002 | Enzminger et al. |
| 2002/0155891 | A1 | 10/2002 | Okada et al. |
| 2003/0045344 | A1 | 3/2003 | Webb et al. |

2003/0054881 A1 3/2003 Hedrick et al.
2003/0054888 A1 3/2003 Walker et al.
2003/0064788 A1 4/2003 Walker et al.
2003/0064798 A1 4/2003 Grauzer et al.
2003/0064808 A1 4/2003 Hecht et al.
2003/0073489 A1 4/2003 Hecht et al.
2003/0073490 A1 4/2003 Hecht et al.
2003/0073491 A1 4/2003 Hecht et al.
2003/0109306 A1 6/2003 Karmarkar
2003/0141660 A1 7/2003 Colapinto et al.
2003/0148812 A1 8/2003 Paulsen et al.
2003/0186745 A1 10/2003 Nguyen et al.
2003/0195024 A1 10/2003 Slattery
2003/0199312 A1 10/2003 Walker et al.
2003/0232640 A1 12/2003 Walker et al.
2003/0236115 A1 12/2003 Chamberlain
2004/0002385 A1 1/2004 Nguyen
2004/0053666 A1 3/2004 Vancura
2004/0053695 A1 3/2004 Mattice et al.
2004/0063489 A1 4/2004 Crumby
2004/0067790 A1 4/2004 Peterson et al.
2004/0077397 A1 4/2004 Hosaka
2004/0082372 A1 4/2004 Romero
2004/0106449 A1 6/2004 Walker et al.
2004/0116179 A1 6/2004 Nicely et al.
2004/0116183 A1 6/2004 Prindle
2004/0142739 A1 7/2004 Loose et al.
2004/0142747 A1 7/2004 Pryzby
2004/0147311 A1 7/2004 Fujimoto
2004/0152518 A1 8/2004 Kogo
2004/0171415 A1 9/2004 Webb et al.
2004/0192442 A1 9/2004 Wells et al.
2004/0198485 A1 10/2004 Loose et al.
2004/0209685 A1 10/2004 Lucchesi et al.
2004/0242307 A1 12/2004 Laakso et al.
2005/0043090 A1 2/2005 Pryzby et al.
2005/0054440 A1 3/2005 Anderson et al.
2005/0054441 A1 3/2005 Landrum et al.
2005/0054442 A1 3/2005 Anderson et al.
2005/0059494 A1 3/2005 Kammler
2005/0064935 A1 3/2005 Blanco
2005/0181854 A1 8/2005 Moshal
2005/0277469 A1 12/2005 Pryzby et al.
2005/0282631 A1 12/2005 Bonney et al.
2006/0009284 A1 1/2006 Schwartz et al.
2006/0059046 A1 3/2006 Mohr et al.
2006/0063587 A1 3/2006 Manzo
2006/0068872 A1 3/2006 Walker et al.
2006/0068899 A1 3/2006 White et al.
2006/0073881 A1 4/2006 Pryzby et al.
2006/0084501 A1 4/2006 Walker et al.
2006/0089188 A1 4/2006 Romero
2006/0154722 A1 7/2006 Walker et al.
2006/0194631 A1 8/2006 Rowe et al.
2006/0242020 A1 10/2006 Walker et al.
2006/0247037 A1 11/2006 Park
2006/0252482 A1 11/2006 Walker et al.
2006/0281543 A1 * 12/2006 Sutton et al. .................... 463/29
2007/0077981 A1 4/2007 Hungate et al.
2007/0135193 A1 6/2007 Nicely
2008/0161090 A1 7/2008 Okada
2008/0182655 A1 7/2008 De Waal et al.
2009/0124384 A1 5/2009 Smith et al.
2011/0223995 A1 * 9/2011 Geisner et al. .................. 463/36
2011/0281646 A1 11/2011 Nguyen et al.

FOREIGN PATENT DOCUMENTS

WO WO 01/76709 10/2001
WO WO 01/80962 11/2001
WO WO 03/044709 5/2003
WO WO 2004/095383 11/2004
WO WO 2004/111893 12/2004
WO WO 2005/006238 1/2005
WO WO 2006/031766 3/2006

* cited by examiner

FIG. 3B

320

| Player's Estimated Emotional State Data | | |
|---|---|---|
| **Time** | **Estimated Emotional State Data Component** | **Magnitude Component** |
| $T_0$ | Neutral | 0 |
| $T_1$ | Positive | 1 |
| $T_2$ | Positive | 4 |
| $T_3$ | Positive | 3 |
| $T_4$ | Positive | 4 |
| $T_5$ | Positive | 3 |
| $T_6$ | Neutral | 0 |
| $T_7$ | Negative | 1 |
| $T_8$ | Positive | 4 |
| $T_9$ | Positive | 3 |
| $T_{10}$ | Positive | 10 |

330

| Expected Emotional Response Data | | | |
|---|---|---|---|
| **Time** | **Designated Event** | **Expected Emotional Response Data Component** | **Magnitude Component** |
| $T_1$ | Winning Outcome in Primary Game | Positive | 1 |
| $T_2$ | Top Winning Outcome in Primary Game | Positive | 3 |
| $T_3$ | Losing Outcome in Primary Game | Negative | 1 |
| $T_4$ | Winning Outcome in Primary Game | Positive | 1 |
| $T_5$ | Inactivity for 10 Seconds | Neutral | 1 |
| $T_6$ | Bonus Game Not Triggered Within Two Minutes | Negative | 3 |
| $T_7$ | Losing Outcome in Primary Game | Negative | 1 |
| $T_8$ | Initiation of a Play of the Bonus Game | Positive | 5 |
| $T_9$ | Minimum Award Provided for a Play of the Game Bonus | Negative | 1 |
| $T_{10}$ | Progressive Award Provided | Positive | 10 |

GAMING SYSTEM, GAMING DEVICE, AND METHOD PROVIDING AN ESTIMATED EMOTIONAL STATE OF A PLAYER BASED ON THE OCCURRENCE OF ONE OR MORE DESIGNATED EVENTS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on the amount of the wager (e.g., the higher the wager, the higher the award). Winning symbols or winning symbol combinations that are less likely to occur usually provide higher awards.

For such known gaming machines, the amount of the wager placed on the primary game by the player may vary. For instance, the gaming machine may enable the player to wager a minimum number of credits, such as one credit (e.g., one cent, nickel, dime, quarter, or dollar) up to a maximum quantity of credits, such as five credits. This wager may be placed by the player a single time or multiple times in a single play of the primary game. For instance, a gaming machine configured to operate a slot game may have one or more paylines, and the gaming machine may enable a player to place a wager on each payline for a single play of the slot game. Thus, it is known that a gaming machine, such as one configured to operate a slot game, may enable players to place wagers of substantially different amounts on each play of the primary game ranging, for example, from one credit up to 125 credits (e.g., five credits on each of twenty-five separate paylines). This is also true for other wagering games, such as video draw poker, where players can place wagers of one or more credits on each hand, and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an award to a player in addition to any awards provided for any plays of one or more primary games. Secondary or bonus games usually do not require an additional wager by the player to be activated. Secondary or bonus games are generally activated or triggered upon an occurrence of a designated triggering symbol or triggering symbol combination in the primary game. For instance, a bonus symbol occurring on the payline on the third reel of a three reel slot machine may trigger the secondary or bonus game. When a secondary or bonus game is triggered, the gaming machine generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Most gaming machines provide content that is static and predictable. That is, most gaming machines operate without regard to a player's reaction or reactions to certain features, aspects, or functions of the gaming machines, such as the content of any primary and secondary games of those gaming machines, the pace of play of those games, and the outcomes of plays of those games. These gaming machines are, therefore, not configured to adapt in response to such player reactions.

Certain known or proposed gaming machines attempt to solve this problem by ascertaining a player's actual reaction to certain features, aspects, or functions of those gaming machines. For example, one such known gaming machine includes a camera configured to read facial expressions and/or body language of a player, and uses the detected facial expressions and/or body language to infer the player's reactions to certain features, aspects, or functions of the gaming machine. One such proposed gaming machine includes a biometric device configured to detect a physical reaction of the player, such as a change in heart rhythm or a change in brain waves, to one or more features, aspects, or functions of the gaming machine, and uses that detected reaction to infer a player's emotional state. These devices are, however, difficult and expensive to implement. Specifically, the hardware of these known gaming machines must be modified to include the camera or the biometric device, and the gaming machines must include relatively expensive facial and/or body language recognition software to properly infer the player's reactions. Further, effectively deploying and maintaining such a camera and/or a biometric device within a casino environment is difficult due to interference caused by the busy atmosphere of the casino and various environmental hazards, such as spilled drinks, gaming machine cabinet wear and tear, and dust.

Accordingly, there is a continuing need to provide new, inexpensive ways of estimating a player's emotional state during play of a gaming session to enable a gaming system to enhance the player's gaming experience.

SUMMARY

Various embodiments of the present disclosure provide a gaming system, gaming device, and method providing an estimated emotional state of a player based on the occurrence of one or more designated events. In general, for a given player, the gaming system determines an initial estimated emotional state of that player upon the initiation of a gaming session, and updates that player's estimated emotional state based on the occurrence of one or more designated events during the gaming session. The gaming system monitors that player's estimated emotional state and, if a triggering condition associated with that player's estimated emotional state is satisfied, modifies at least one aspect of the gaming system.

More specifically, when a player of a gaming system initiates a gaming session, the gaming system estimates the player's emotional state. For each of one or more designated events that occurs during the gaming session, the gaming system updates the player's estimated emotional state in response to the occurrence of that designated event using an expected emotional response to that designated event. If one or more triggering conditions associated with the player's estimated emotional state are satisfied during the gaming session, the gaming system modifies one or more functions, aspects, or features of the gaming system; adds one or more functions, aspects, or features to the gaming system; and/or removes one or more functions, aspects, or features from the gaming system. For example, upon initiation of a gaming session, the gaming system estimates a player's emotional state as being a neutral emotional state having a magnitude of zero. In this example, achieving five consecutive losing outcomes is a designated event associated with a negative expected emotional response having a magnitude of five. Additionally, in this example, a triggering condition is satisfied when the player's estimated emotional state reaches a negative emotional state having a magnitude of five, and when the triggering condition is satisfied, the gaming system provides a free play of a bonus game to the player. In this example, the player achieves five consecutive losing outcomes during the gaming session. Accordingly, the gaming system updates the player's estimated neutral emotional state having a magnitude of zero with the negative expected emotional response having a magnitude of five, which results in the player's estimated emotional state becoming a negative emotional state having a magnitude of five. At this point in this example, the triggering condition is satisfied, and the gaming system provides the player with a free play of the bonus game.

Accordingly, the present disclosure estimates a player's emotional state during play of a gaming session to enable the gaming system to enhance the player's gaming experience based on the player's estimated emotional state.

Additional features and advantages are described herein, and will be apparent from, the following Detailed Description and the Figures.

BRIEF DESCRIPTION OF THE FIGURES

FIG. 3B illustrates a player's estimated emotional state data for a gaming session in tabular form in an estimated emotional state data table, and illustrates expected emotional response data for designated events occurring during the gaming session in an expected emotional response data table.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling the base or primary game of the present disclosure are communicated from the central server to the gaming device in a thick client configuration and computerized instructions for controlling any secondary or bonus games or functions are executed by a central server in a thin client configuration.

Figure 1A:
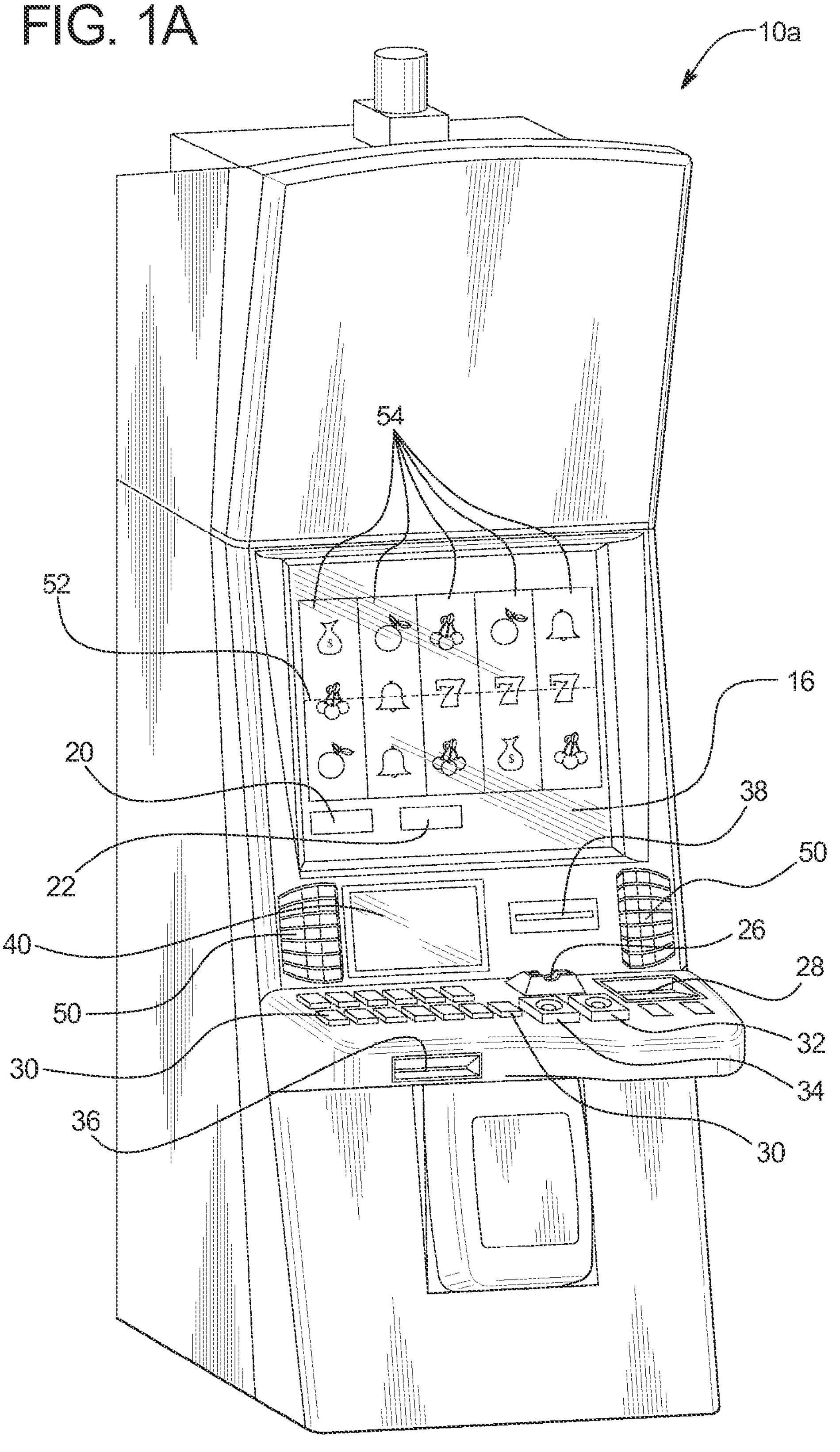
FIGS. 1A and 1B are perspective views of example alternative embodiments of a gaming device of the gaming system of the present disclosure.
Figure 1B:
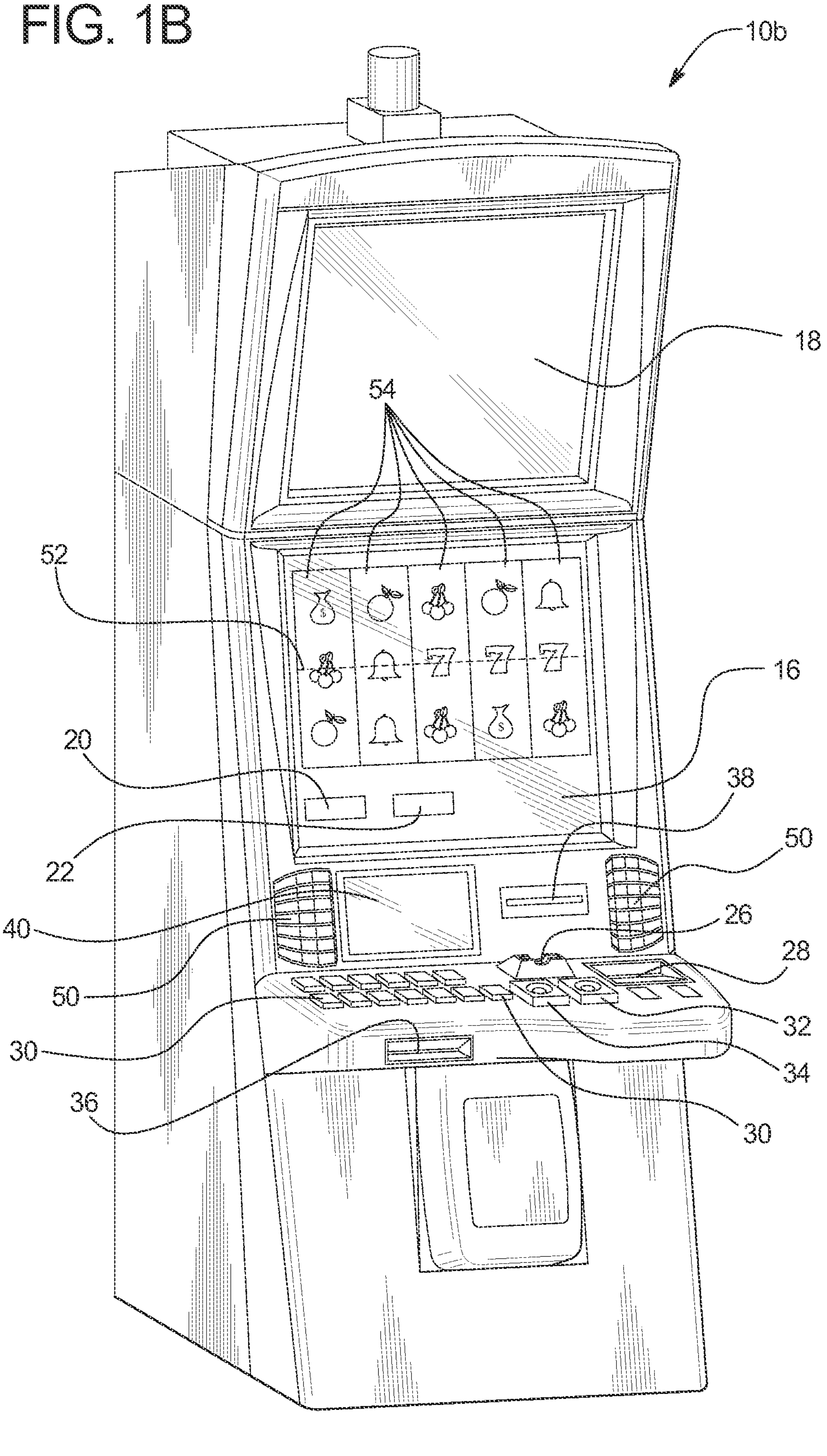

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
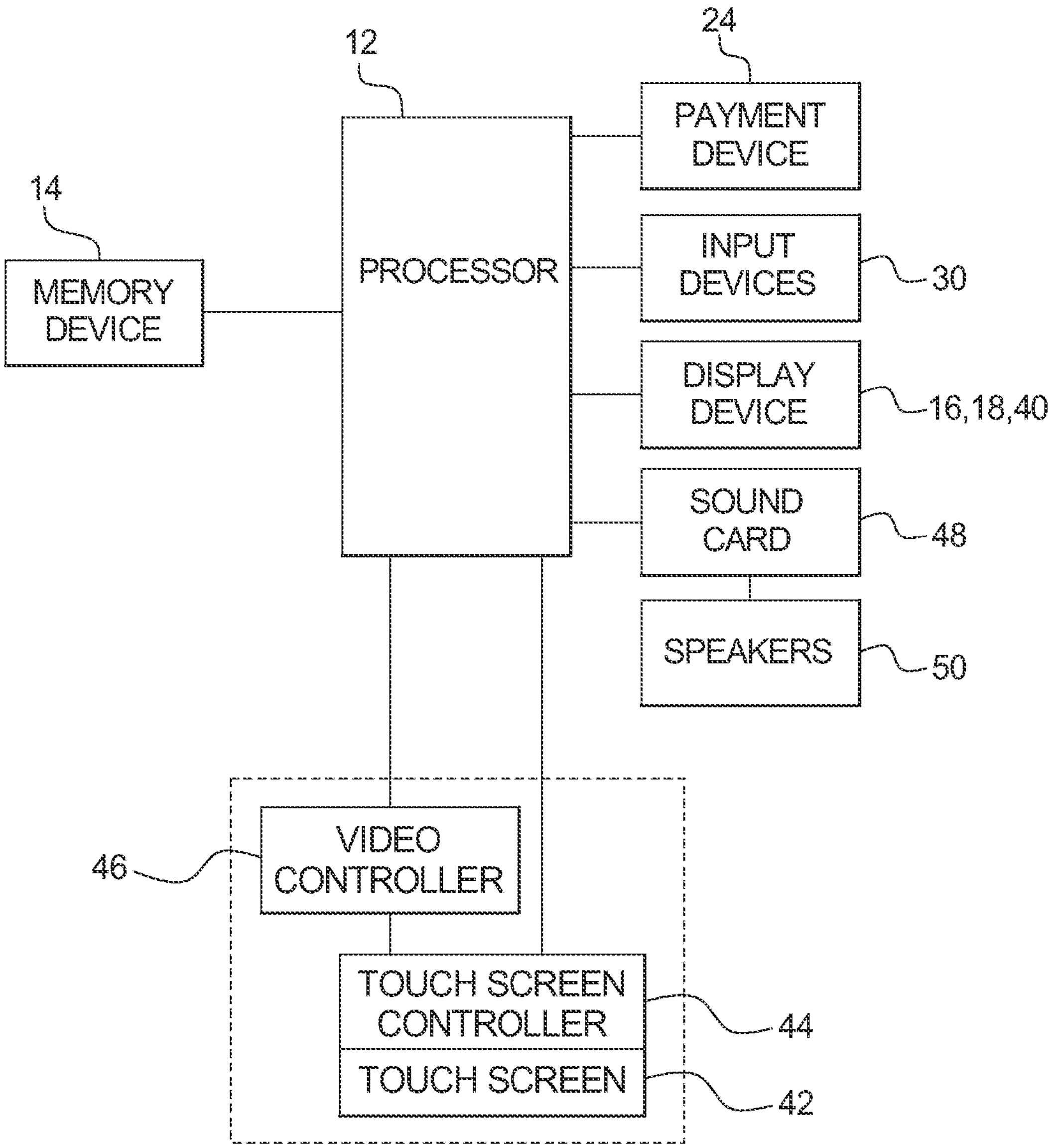
FIG. 2A is a schematic block diagram of one embodiment of an electronic configuration for one of the gaming devices of the gaming system disclosed herein.

In one embodiment, as illustrated in FIG. 2A, the gaming device includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, non-transitory computer readable medium, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays any suitable base or primary game. This display device may also display any suitable secondary or bonus game associated with the base or primary game as well as information relating to the base or primary game or the secondary or bonus game. The alternative embodiment shown in FIG. 1B includes a central display device 16 and an upper display device 18. The upper display device may display the base or primary game, any suitable secondary or bonus game associated or not associated with the base or primary game, and/or information relating to the base or primary game or the secondary or bonus game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the base or primary game or the secondary or bonus game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start the base or primary game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the base or primary game and/or the secondary or bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the base or primary game and/or the secondary or bonus game as a game image, symbol, or indicia.

Gaming device 10 incorporates the base or primary game and any secondary or bonus game associated with the base or primary game. The gaming machine or device may include some or all of the features of conventional gaming machines or devices. The gaming device may incorporate any suitable reel-type game, card game, cascading or falling symbol game, number game, or other game of chance susceptible to representation in an electronic or electromechanical form as a secondary or bonus game or feature, which in one embodiment produces a random outcome based on probability data at the time of or after placement of a wager. That is, different base or primary games or secondary or bonus games, such as video poker games, video blackjack games, video keno games, and video bingo games may be implemented.

In one embodiment, the base or primary game and/or the secondary or bonus game includes one or more paylines 52 associated with a plurality of symbol display positions. The paylines may be horizontal, vertical, circular, diagonal, angled, or any combination thereof. In this embodiment, the gaming device includes at least one and preferably a plurality of reels 54, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, base or primary game or the secondary or bonus game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the base or primary game or the secondary or bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the base or primary game or the secondary or bonus game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, as noted above, in addition to winning credits or other awards in the base or primary game, the gaming device may also give players the opportunity to win credits in a secondary or bonus game or in a secondary or bonus round. The secondary or bonus game enables the player to obtain a prize or payout in addition to the prize or payout, if any, obtained from the base or primary game. In general, a secondary or bonus game produces a significantly higher level of player excitement than the base or primary game because it provides a greater expectation of winning than the base or primary game, and is accompanied with more attractive or unusual features than the base or primary game. In one embodiment, the secondary or bonus game may be any type of suitable game, either similar to or completely different from the base or primary game.

In one embodiment, the triggering event or qualifying condition may be a selected outcome in the base or primary game or a particular arrangement of one or more indicia on a display device in the base or primary game, such as a BONUS symbol appearing on three adjacent reels along a payline in the base or primary game. In other embodiments, the triggering event or qualifying condition occurs based on exceeding a certain amount of game play (such as number of games, number of credits, amount of time), or reaching a specified number of points earned during game play.

In another embodiment, gaming device processor 12 or central controller 56 randomly provides the player one or more plays of one or more secondary or bonus games. In one such embodiment, the gaming device does not provide any apparent reason to the player for qualifying to play a secondary or bonus game. In this embodiment, qualifying for a secondary or bonus game is not triggered by an event in or based specifically on any of the plays of the base or primary game. That is, the gaming device may simply qualify a player to play a secondary or bonus game without any explanation or alternatively with simple explanations. In another embodiment, the gaming device (or central server) qualifies a player for a secondary or bonus game at least partially based on a game triggered or symbol triggered event, such as at least partially based on the play of the base or primary game.

In one embodiment, the gaming device includes a program that will automatically begin a secondary or bonus round after the player has achieved a triggering event or qualifying condition in the base or primary game. In another embodiment, after a player has qualified for a secondary or bonus game, the player may subsequently enhance the player's secondary or bonus game participation through continued play of the base or primary game. Thus, for each secondary or bonus qualifying event, such as a bonus symbol, that the player obtains, a given number of secondary or bonus game wagering points or credits may be accumulated in a "bonus meter" programmed to accrue the secondary or bonus wagering credits or entries toward eventual participation in a secondary or bonus game. The occurrence of multiple such secondary or bonus qualifying events in the base or primary game may result in an arithmetic or exponential increase in the number of secondary or bonus wagering credits awarded. In one embodiment, the player may redeem extra secondary or bonus wagering credits during the secondary or bonus game to extend play of the secondary or bonus game.

In one embodiment, no separate entry fee or buy-in for a secondary or bonus game is needed. That is, a player may not purchase entry into a secondary or bonus game; rather, the player must win or earn entry through play of the base or primary game, thus encouraging play of the base or primary game. In another embodiment, qualification of the secondary or bonus game is accomplished through a simple "buy-in" by the player—for example, if the player has been unsuccessful at qualifying through other specified activities. In another embodiment, the player must make a separate side-wager on the secondary or bonus game or wager a designated amount in the base or primary game to qualify for the secondary or bonus game. In this embodiment, the secondary or bonus game triggering event must occur and the side-wager (or designated base or primary game wager amount) must have been placed to trigger the secondary or bonus game.

Figure 2B:
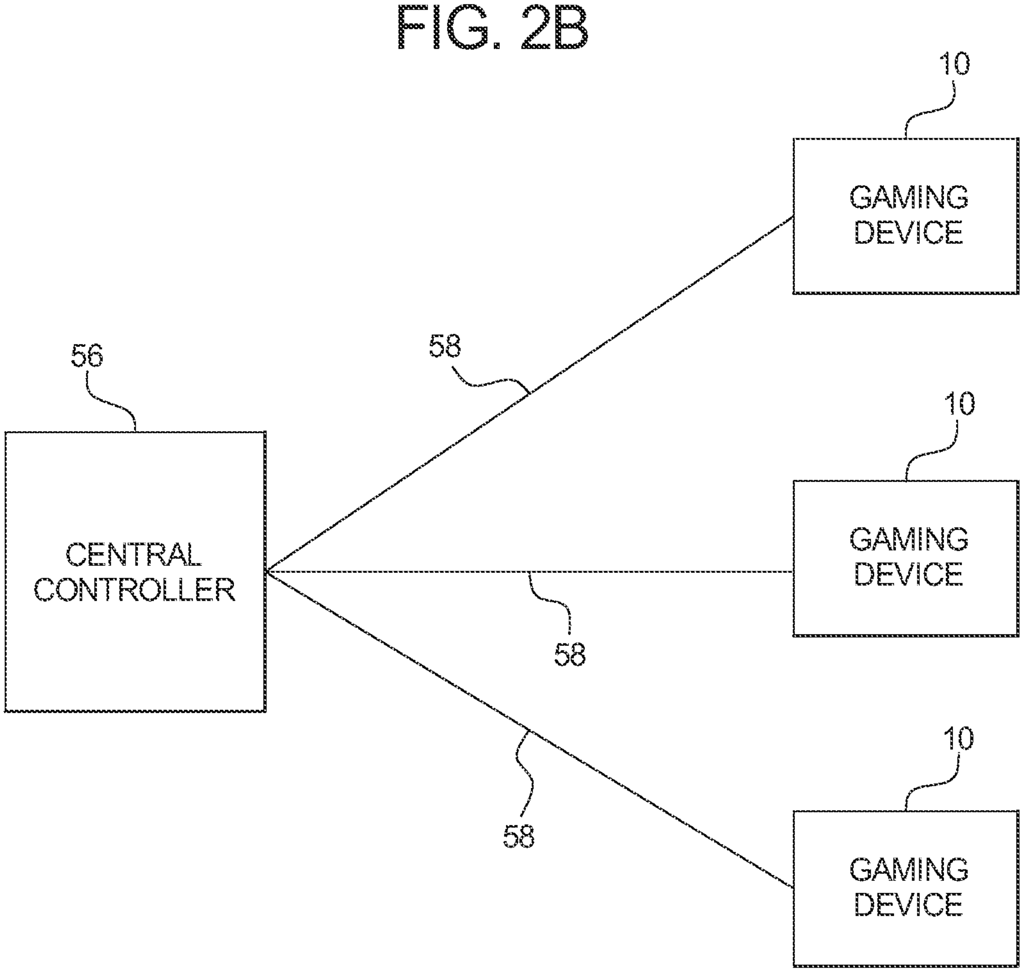
FIG. 2B is a schematic block diagram of one embodiment of a network configuration for a plurality of gaming devices of the gaming system disclosed herein.

In one embodiment, as illustrated in FIG. 2B, one or more of gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the base or primary game based on probability data. In another embodiment, the central server or controller randomly generates a game outcome for the secondary or bonus game based on probability data. In another embodiment, the central server or controller randomly generates a game outcome for both the base or primary game and the secondary or bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a base or primary game outcome, a secondary or bonus game outcome, base or primary game and secondary or bonus game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the base or primary game or the secondary or bonus game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first stage, and a second gaming device to have selected elements marked in a different predetermined pattern is provided a second outcome of win $2, which will be provided to a second player regardless of how the second player plays a second stage. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for the base or primary game, a secondary or bonus game, or both. In another embodiment, the game program may be executable as a secondary or bonus game to be played simultaneous with the play of the base or primary game (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate the base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of the base or primary game. That is, a player is provided a progressive award without any explanation or, alternatively, with simple explanations. In another embodiment, a player is provided a progressive award at least partially based on a game triggered or symbol triggered event, such as at least partially based on the play of the base or primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the base or primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the base or primary game of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the base or primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Estimating a Player's Emotional State Based on the Occurrence of One or More Designated Events Various embodiments of the present disclosure provide a gaming system, gaming device, and method providing an estimated emotional state of a player based on the occurrence of one or more designated events. Generally, the present disclosure provides that when a player of a gaming system initiates a gaming session, the gaming system estimates the player's emotional state and generates estimated emotional state data for the player that represents that estimation of the player's emotional state. For each of one or more designated events that occurs during the gaming session, the gaming system updates the player's estimated emotional state in response to the occurrence of that designated event using an expected emotional response to that designated event. More specifically, the gaming system updates the player's estimated emotional state data using expected emotional response data representing the expected emotional response to that designated event. After the gaming system updates the player's estimated emotional state data, the player's estimated emotional state data represents an estimation of the player's emotional state following the occurrence of that designated event. If one or more triggering conditions associated with the player's estimated emotional state is satisfied during the gaming session, the gaming system modifies one or more functions, aspects, or features of the gaming system; adds one or more functions, aspects, or features to the gaming system; and/or removes one or more functions, aspects, or features from the gaming system.

The gaming system is configured to operate one or more primary wagering games (referred to herein as "primary games") upon one or more wagers by a player and, in certain embodiments, one or more secondary or bonus games (referred to herein as "secondary games"). As explained above, any primary game or games and any secondary game or games may be any suitable games such as, but not limited to, video slot or spinning reel games; video poker, video blackjack, or other video card games; video bingo games; video keno games; video roulette games; video selection games; or any suitable combination thereof.

When a player initiates a gaming session, such as by inserting a player tracking card into a card reader of the gaming system, the gaming system estimates the player's emotional state and generates estimated emotional state data for the player that represents that estimation of the player's emotional state. The player's estimated emotional state data includes one or more components, each of which represents an aspect or feature of the player's estimated emotional state. It should be appreciated that the player's estimated emotional state data may include any suitable quantity of components. In one embodiment, the player's estimated emotional state data includes a single component: an estimated emotional state data component that represents either a positive estimated emotional state, a neutral estimated emotional state, or a negative estimated emotional state. In another embodiment, the player's estimated emotional state data includes two components: (a) an estimated emotional state data component that represents either a positive estimated emotional state, a neutral estimated emotional state, or a negative estimated emotional state, and (b) a magnitude component that represents a magnitude of that positive, neutral, or negative estimated emotional state.

The gaming system includes one or more designated events associated with one or more functions, aspects, or features of the gaming system. In certain embodiments, each event associated with one or more of the functions, aspects, or features of the gaming system is a designated event. In other embodiments, each event associated with one or more of the functions, aspects, or features of the gaming system is not a designated event. That is, in these embodiments, at least one but less than all of the events associated with one or more of the functions, aspects, or features of the gaming system is a designated event. In certain embodiments, the designated events are events associated with at least one of any primary games and any secondary games. For example, in various embodiments, one or more of the designated events occur when: (a) a new gaming session is initiated; (b) a designated period of time during which the gaming system is idle or inactive elapses; (c) a secondary game is initiated; (d) a winning outcome occurs for a play of a primary game or a secondary game; (e) a losing outcome occurs for a play of a primary game or a secondary game; (f) one or more designated outcomes occur for a play of a primary game or a secondary game; (g) the player deposits currency or credits onto the gaming system; (h) the gaming system provides the player a jackpot award, progressive award, or other designated award during that gaming session; (i) the length of time of that gaming session reaches at least a designated length of time; (j) the quantity of plays of wagering games played during the gaming session reaches at least a designated quantity; (k) the time of day reaches at least a designated time of day; (l) the player wins at least a designated amount of credits or currency during the gaming session; (m) the player loses at least a designated amount of credits or currency during the gaming session; (n) the player was not provided with any plays of a secondary or bonus game during a designated period of time or a designated quantity of plays; (o) a quantity of consecutive winning outcomes during the gaming session reaches a designated quantity; (p) a quantity of consecutive losing outcomes during the gaming session reaches a designated quantity; (q) a quantity of winning outcomes achieved during the gaming session reaches a designated quantity; (r) a quantity of losing outcomes achieved during the gaming session reaches a designated quantity; (s) the player wins a relatively small award for a play of the primary game; (t) the player wins a relatively small award for a play of the secondary game; (u) a quantity of streaks of at least a designated number of consecutive winning outcomes reaches a designated quantity; (v) a quantity of streaks of at least a designated number of consecutive losing outcomes reaches a designated quantity; (w) the player achieves a "near miss" outcome during play of the primary game or the secondary game (for example, achieves an outcome in a spinning wheel game that is adjacent to a jackpot or progressive award outcome); (x) the player's credit meter reaches a designated level; (y) the player lost the player's initial deposit; (z) the player deposits currency or credits at least a designated quantity of times during the gaming session; (aa) a total deposited amount of currency or credits reaches a designated amount; (bb) the satisfaction of one or more of the triggering conditions described below; (cc) any of the above during a designated period of time (such as one day, one week, one month, or one year) rather than during a gaming session; (dd) the gaming system provides the player a relatively insubstantial prize external to the gaming machine, such as promotional credits; (ee) the gaming system provides the player with a relatively substantial prize external to the gaming machine, such as a car or show tickets; (ff) a rate of interaction of the player with the gaming system reaches a designated rate (for example, a number of times the player touches a button or touch screen of the gaming system over a designated time period reaches a designated rate); (gg) the player changing one or more features of the gaming system (such as volume, bonus game, representative avatar); and (hh) any suitable combination thereof.

Each designated event is associated with one of a plurality of different expected emotional responses, each of which is represented by expected emotional response data. Each expected emotional response data includes one or more components, each of which corresponds to one of the components of the player's estimated emotional state data. It should be appreciated that each of the expected emotional response data may include any suitable quantity of components. It should also be appreciated that the components may represent any suitable aspect of the expected emotional response represented by the expected emotional response data. In certain embodiments, the expected emotional responses and corresponding expected emotional response data are predetermined. In other embodiments, gaming system modifies the expected emotional responses and corresponding expected emotional response data based on the occurrence of one or more designated events during the gaming session.

For instance, in the embodiment described above in which the player's estimated emotional state data includes the single estimated emotional state data component that represents either a positive estimated emotional state, a neutral estimated emotional state, or a negative estimated emotional state, each designated event is associated with an expected emotional response represented by expected emotional response data having a single component: an expected emotional response data component that represents either a positive expected emotional response, a neutral expected emotional response, or a negative expected emotional response. In one example of this embodiment: (a) the occurrence of a winning outcome (i.e., one of the designated events) is associated with an expected emotional response represented by expected emotional response data including a single expected emotional response data component representing a positive expected emotional response, and (b) the occurrence of a losing outcome (i.e., another one of the designated events) is associated with an expected emotional response represented by expected emotional response data including a single expected emotional response data component representing a negative expected emotional response.

Similarly, in the embodiment described above in which the player's estimated emotional state data includes: (a) an estimated emotional state data component that represents either a positive estimated emotional state, a neutral estimated emotional state, or a negative estimated emotional state, and (b) a magnitude component that represents a magnitude of that positive, neutral, or negative estimated emotional state, each designated event is associated with an expected emotional response represented by expected emotional response data having: (a) an expected emotional response data component that represents either a positive expected emotional response, a neutral expected emotional response, or a negative expected emotional response, and (b) a magnitude component that represents a magnitude of that positive, neutral, or negative expected emotional response. In one example of this embodiment: (a) the occurrence of a winning outcome (i.e., one of the designated events) is associated with a first expected emotional response represented by first expected emotional response data including: (i) a first expected emotional response data component representing a positive expected emotional response, and (ii) a first magnitude component representing a magnitude of 1, and (b) the occurrence of a secondary game (i.e., one of the designated events) is associated with a second expected emotional response represented by second expected emotional response data including: (i) a second expected emotional response data component representing a positive expected emotional response, and (ii) a second magnitude component representing a magnitude of 5.

After the occurrence of one of the designated events, the gaming system uses the expected emotional response data that represents the expected emotional response associated with that designated event to update or modify the player's estimated emotional state data. After being updated, the player's estimated emotional state data represents the player's estimated emotional state following the occurrence of that designated event.

For instance, in one example of the embodiment described above in which the player's estimated emotional state data includes two components, one designated event is an occurrence of a secondary game, and the expected emotional response data representing the expected emotional response associated with that designated event includes an expected emotional response data component representing a positive emotional reaction and a magnitude component representing a magnitude of 5. That is, this expected emotional response data represents a "positive 5" or "+5" expected emotional response. In this example, the player's estimated emotional state data includes an estimated emotional state data component representing a negative emotional state and a magnitude component representing a magnitude of 3. That is, the player's estimated emotional state data represents a "negative 3" or "−3" estimated emotional state of the player. In this example, the secondary game occurs. Accordingly, the gaming system updates the player's estimated emotional state data (which is "−3" in this example) using the expected emotional response data (which is "+5" in this example) associated with the occurrence of the secondary game. Specifically, in this embodiment, the gaming system increases the player's estimated emotional state data by a magnitude of 5 in the positive direction such that the player's estimated emotional state data is a "+2." Thus, following the updating of the player's estimated emotional state, the estimated emotional state data component represents a positive emotional state and the magnitude component represents a magnitude of 2 (i.e., the player's estimated emotional state data represents a "positive 2" or "+2" estimated emotional state of the player).

Table 1 below includes additional examples of designated events, their associated expected emotional response data, and the corresponding actions performed by the gaming system to update or modify the player's estimated emotional state data upon the occurrence of the designated events.

TABLE 1

| | Expected Emotional Response Data | | |
|---|---|---|---|
| Designated Event | Expected Emotional Response Data Component | Magnitude Component | Action Taken by Gaming System |
| Gaming system is idle or inactive for 10 seconds | Neutral | 1 | Modify the player's estimated emotional state data in the direction of neutrality by a magnitude of 1 |
| Occurrence of a secondary game | Positive | 5 | Increase the player's estimated emotional state data in the positive direction by a magnitude of 5 |
| Occurrence of a winning outcome in a play of a primary game | Positive | 1 | Increase the player's estimated emotional state data in the positive direction by a magnitude of 1 |
| Occurrence of a losing outcome in a play of a primary game | Negative | 1 | Increase the player's estimated emotional state data in the negative direction by a magnitude of 1 |
| Player deposits currency | Positive | 2 | Increase the player's estimated emotional state data in the positive direction by a magnitude of 2 |
| Player initiates a gaming session | Neutral | 0 | Reset the player's estimated emotional state data such that it represents a neutral estimated emotional state having a magnitude of 0 |

If one or more triggering conditions associated with the player's estimated emotional state is satisfied during the gaming session, the gaming system modifies one or more functions, aspects, or features of the gaming system; adds one or more functions, aspects, or features to the gaming system; and/or removes one or more functions, aspects, or features from the gaming system. In certain embodiments, the triggering conditions are predetermined. In other embodiments, each triggering condition is associated with a specific modification, addition, or removal. In various embodiments, the modification, addition, or removal associated with a triggering condition is selected from a group of modifications, additions, or removals.

For instance, in the example described above in which the player's estimated emotional state data increased from "−3" to "+2" following the occurrence of the secondary event, the gaming system includes a triggering condition that is satisfied when the estimated emotional state data component of the player's estimated emotional state data changes from representing a negative estimated emotional state to representing a positive estimated emotional state. When that triggering condition is satisfied, the gaming system displays a celebration animation to the player. In this example, the change in the player's estimated emotional state data from "−3" to "+2" represents a change from a negative emotional state to a positive emotional state. Thus, in this example, the gaming system displays the celebration animation to the player because the estimated emotional state data component of the player's estimated emotional state changed from representing a negative estimated emotional state to representing a positive estimated emotional state.

Figure 3A:
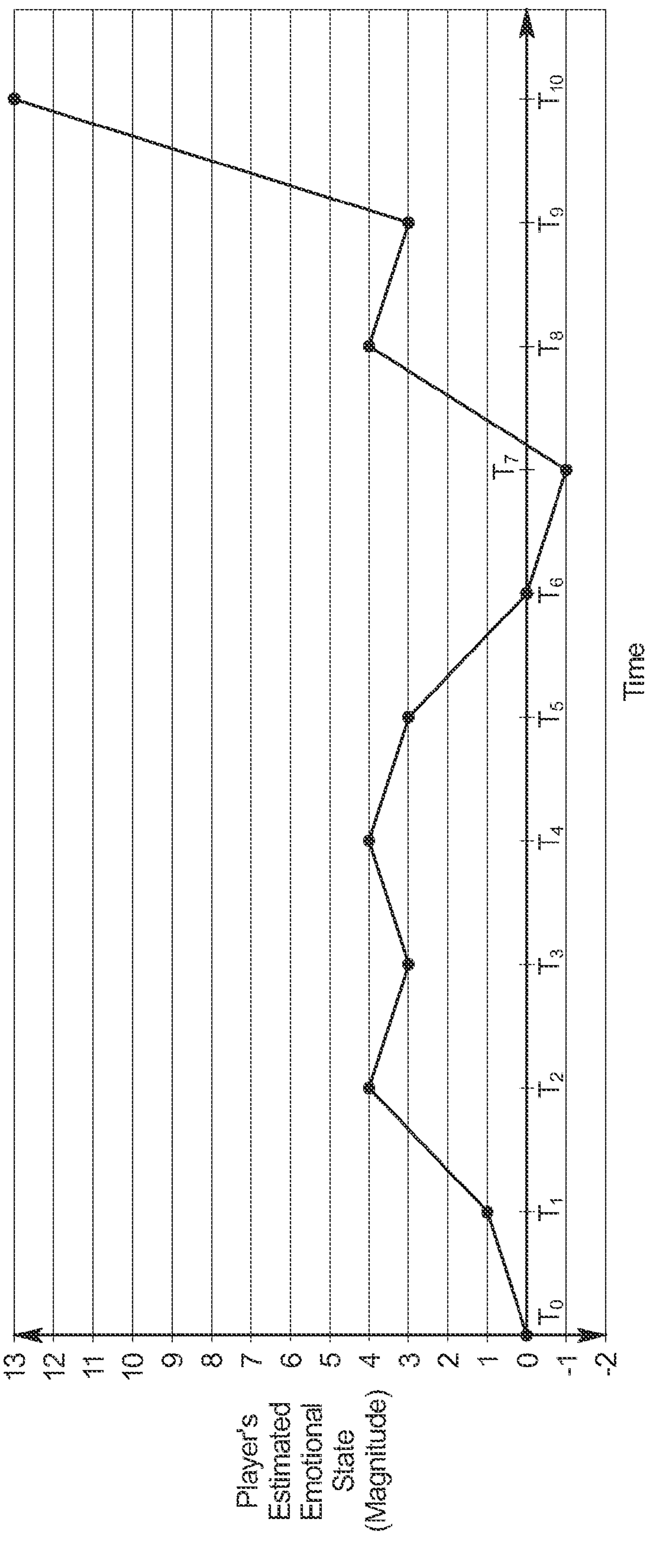
FIG. 3A illustrates a graph of a player's estimated emotional state data with respect to time during a gaming session.

It should be appreciated that any suitable triggering condition or conditions may be employed. For example, in various embodiments, a triggering condition is satisfied when: (a) the estimated emotional state data component changes from representing a negative estimated emotional state to representing a positive estimated emotional state; (b) the estimated emotional state data component changes from representing a positive estimated emotional state to representing a negative estimated emotional state; (c) the estimated emotional state data component changes from representing a negative estimated emotional state to representing a neutral estimated emotional state; (d) the estimated emotional state data component changes from representing a positive estimated emotional state to representing a neutral estimated emotional state; (e) the estimated emotional state data component changes from representing a neutral estimated emotional state to representing a positive estimated emotional state; (f) the estimated emotional state data component changes from representing a neutral estimated emotional state to representing a negative estimated emotional state; (g) the estimated emotional state data component represents a positive estimated emotional state for a designated quantity of plays of one or more games or for a designated period of time; (h) the estimated emotional state data component represents a negative estimated emotional state for a designated quantity of plays of one or more games or for a designated period of time; (i) the estimated emotional state data component represents a neutral estimated emotional state for a designated quantity of plays of one or more games or for a designated period of time; (j) the estimated emotional state data component changes from representing a negative estimated emotional state to representing a positive estimated emotional state a designated quantity of times; (k) the estimated emotional state data component changes from representing a positive estimated emotional state to representing a negative estimated emotional state a designated quantity of times; (l) the magnitude reaches a designated magnitude; (m) the magnitude exceeds a designated magnitude; (n) the magnitude falls below a designated magnitude; (o) the magnitude increases at at least a designated frequency; (p) the magnitude decreases at at least a designated frequency; (q) the magnitude does not change for a designated quantity of plays of one or more games or for a designated period of time; (r) the magnitude is at least a designated magnitude for a designated quantity of plays of one or more games or for a designated period of time; (s) the magnitude changes at least a designated amount; (t) the rate of the rate of change (i.e., acceleration or deceleration) of the magnitude component over a designated time period reaches a designated rate of change; or (u) any suitable combination thereof. It should be appreciated that a plurality of mathematical interpretations associated with a graph of the player's estimated emotional state with respect to time (as illustrated in FIG. 3A and explained in detail below) may be used to determine the triggering condition. In one example, the triggering condition is satisfied when the area under the plot of the player's estimated emotional state with respect to time, which represents the total emotional value over a designated time period, reaches a designated total emotional value.

It should be appreciated that the gaming system modifies any suitable function, aspect, or feature of the gaming system, adds any suitable function, aspect, or feature to the gaming system, and/or removes any suitable function, aspect, or feature from the gaming system when the player's estimated emotional state data reaches one of the thresholds during the gaming session. In various embodiments, when a triggering condition is satisfied, the gaming system: (a) modifies an aspect of the display, such as by changing a background color; (b) modifies audio, such as music, output by the gaming system, such as by increasing or decreasing the tempo of the audio or by increasing or decreasing the volume of the audio; (c) displays one or more animations; (d) modifies one or more aspects of features of one or more primary or secondary games, such as by displaying different animations, displaying different symbols or indicia, modifying existing symbols or indicia, changing a theme of the primary or secondary game, providing one or more free plays of one or more games, providing one or more awards, changing the volatility of at least one of the primary game and the secondary game, or changing the average expected payback percentage of at least one of the primary game and the secondary game; (e) provides the player one or more comp awards, such as vouchers for a free buffet, a free night in a hotel room, or free show tickets; or (f) any suitable combination thereof.

In one example of the embodiment described above in which the player's estimated emotional state data includes: (a) an estimated emotional state data component that represents either a positive estimated emotional state, a neutral estimated emotional state, or a negative estimated emotional state, and (b) a magnitude component that represents a magnitude of that positive, neutral, or negative estimated emotional state, the gaming system includes the following triggering conditions and associated modifications and additions: (a) when the player's estimated emotional state data component represents a positive estimated emotional state and the magnitude component exceeds a celebration animation threshold magnitude, the gaming system displays a celebration animation; (b) when the player's estimated emotional state data component represents a positive estimated emotional state and the magnitude component exceeds a increased music tempo threshold magnitude, the gaming system increases the tempo of music output by the gaming system; and (c) when the player's estimated emotional state data component represents a positive estimated emotional state and the magnitude component exceeds an increased volume level threshold magnitude, the gaming system increases the volume of music output by the gaming system.

In one embodiment, when one or more of the triggering conditions is satisfied, the gaming system causes an email message, text message, or other suitable message to be sent to the player's cellular phone or email account. In this embodiment, the message includes one or more awards, such as a voucher for a free hotel room stay, a free buffet, or a free show ticket. It should be appreciated that such a message may be sent instead of or in addition to any modifications, additions, or removals associated with the gaming system.

In various embodiments, the gaming system enables casino personnel or other authorized persons to directly modify the player's estimated emotional state based on one or more factors independent of the gaming system. For example, a cashier at a sports book of a casino provides a player with a payout for winning a wager placed on a hockey game. In this example, the cashier determines that winning such a payout would result in a positive emotional response. Accordingly, the cashier directly updates the player's estimated emotional state data with expected emotional response data representing a positive emotional response of a desired magnitude.

In certain embodiments, the gaming system tracks the player's estimated emotional state. More specifically, in these embodiments, the gaming system tracks changes in the player's estimated emotional state data and stores data representing those changes as a player's historical estimated emotional state data. In these embodiments, the gaming system enables a user (such as an operator of the gaming system) to obtain the player's historical estimated emotional state data in one or more formats, such as in the form of a graph or a text description. It should be appreciated that in certain embodiments the gaming system tracks the player's estimated emotional state across a plurality of gaming sessions.

In certain embodiments, when the player initiates a gaming session, the gaming system estimates the player's emotional state to be a default emotional state, and generates default emotional state data as the player's estimated emotional state data. In various embodiments, the default emotional state is a neutral emotional state. In one example of the embodiment described above in which the player's estimated emotional state data includes a single estimated emotional state data component, the default emotional state data includes a single default emotional state data component representing a neutral emotional state. In one example of the embodiment described above in which the player's estimated emotional state data includes two estimated emotional state data components, the default emotional state data includes a first default emotional state data component representing a neutral emotional state and a second default emotional state data component representing a magnitude of 0. It should thus be appreciated that, in these embodiments, the player's estimated emotional state data upon initiation of a gaming session is predetermined and not based on any previous gaming sessions of the player.

In other embodiments, when a player initiates a gaming session, the gaming system estimates the player's emotional state based on the player's prior estimated emotional state. In one example, a player of one gaming system ends a gaming session having an estimated emotional state represented by estimated emotional state data having an estimated emotional state data component representing a positive estimated emotional state and a magnitude component representing a magnitude of 20. The player immediately begins a new gaming session at a different gaming system. In this example, the player's initial estimated emotional state for the new gaming session is based at least in part on the player's prior estimated emotional state.

In certain embodiments, one or more awards (such as awards of credits, free plays of a secondary game, or free plays of a primary game) provided upon the satisfaction of one or more triggering conditions are funded using a gaming establishment's marketing dollars or marketing account. In other embodiments, such awards are funded using a hidden progressive. That is, in these embodiments, a portion of each wager is allocated to a hidden progressive award pool, and when one of the triggering conditions is satisfied, the hidden progressive award pool is used to provide the award associated with that satisfied triggering condition.

In certain embodiments, gaming systems of different denominations (such as \$0.01, \$0.02, \$0.05, \$0.25, \$1.00, and \$5.00) are associated with different designated events; different triggering conditions; and/or different modifications, additions, and removals. In other embodiments, the designated events; triggering conditions; and/or modifications, additions, and removals employed by the gaming system are based on one or more aspects of the player. For example, in one embodiment the player's player tracking status or ranking (e.g., Bronze, Silver, Gold, or Platinum) determines the designated events; triggering conditions; and/or modifications, additions, and removals employed by the gaming system. In another embodiment, the player's demographic (e.g., age, gender, occupation, etc.) determines the designated events; triggering conditions; and/or modifications, additions, and removals employed by the gaming system. In another embodiment, the player's gaming history (e.g., how often the player plays, how much the player usually gambles, and what denomination gaming machines the player usually plays) determines the designated events; triggering conditions; and/or modifications, additions, and removals employed by the gaming system. It should be appreciated that the designated events; triggering conditions; and/or modifications, additions, and removals employed by the gaming system may be determined in any suitable manner.

In various embodiments, the gaming system is a single gaming device. In other embodiments, the gaming system is a gaming device in communication with and configured to operate with a central server, central controller, or remote host (as described in detail above). In one of these embodiments, the gaming system is configured such that: (a) the gaming device stores and periodically transmits data representing the player's game play on the gaming device to the central server, central controller, or remote host; (b) the central server, central controller, or remote host analyzes that data, determines whether any designated events occurred, and updates the player's estimated emotional state accordingly; and (c) the central server, central controller, or remote host determines whether any triggering conditions have been satisfied and, if so, transmits an interrupt signal to the gaming device such that the gaming device interrupts game play and performs the requisite modification, addition, or removal associated with the satisfied triggering condition (such as providing the player with a play of a secondary game). It should thus be appreciated that, in this embodiment, the software of the gaming system need not be significantly (if at all) modified in order to implement the various embodiments of the present disclosure.

In certain embodiments, the present disclosure is implemented without measuring or inferring a player's actual emotional, physical, or other state or measuring or inferring a player's actual emotional, physical, or other reaction to any designated events. That is, in these embodiments, the gaming system does not employ any cameras, biometric devices, or other sensors that are used to measure or infer a player's emotional, physical, or other state or a player's emotional, physical, or other reaction to any designated events. It should be appreciated, however, that in certain other embodiments the present disclosure contemplates using at least one camera, biometric device, or other sensor in addition to the methods described above to estimate a player's emotional state or a player's reaction to any designated events.

FIGS. 3A and 3B illustrate historical data for one example gaming session in which the gaming system determined and tracked a player's estimated emotional state. FIG. 3A illustrates a graph 310 of the player's estimated emotional state data with respect to time during the gaming session. More specifically, the horizontal axis represents time and the vertical axis represents the player's estimated emotional state data, wherein positive numbers indicate a magnitude of a positive estimated emotional state and negative numbers indicate a magnitude of a negative estimated emotional state. FIG. 3B illustrates the player's estimated emotional state data for the gaming session in tabular form in estimated emotional state data table 320, and illustrates expected emotional response data for designated events occurring during the gaming session in expected emotional response data table 330.

The player initiated the gaming session at time $T_0$. In this example, the gaming system sets the estimated emotional state data component of the player's estimated emotional state data to neutral and the magnitude component of the player's estimated emotional state data to 0 upon initiation of a gaming session, as indicated in estimated emotional state data table 320.

As shown in expected emotional response data table 330, a designated event occurs at time $T_1$. Specifically, at time $T_1$, the player achieves a winning outcome for a play of a primary game. In this example, as shown in expected emotional response data table 330, the achievement of a winning outcome for a play of the primary game is associated with expected emotional response data having: (a) an expected emotional response data component representing a positive expected emotional response, and (b) a magnitude component representing a magnitude of 1. As shown in graph 310 and estimated emotional state data table 320, the gaming system modifies the player's estimated emotional state data by increasing the magnitude component of the player's estimated emotional state data by 1 in the positive direction, resulting in the estimated emotional state data component of the player's estimated emotional state data representing a positive estimated emotional state and the magnitude component of the player's estimated emotional state data representing a magnitude of 1.

As shown in expected emotional response data table 330, a designated event occurs at time $T_2$. Specifically, at time $T_2$, the player achieves the top winning outcome for a play of a primary game. In this example, as shown in expected emotional response data table 330, the achievement of the top winning outcome for a play of the primary game is associated with expected emotional response data having: (a) an expected emotional response data component representing a positive expected emotional response, and (b) a magnitude component representing a magnitude of 3. As shown in graph 310 and estimated emotional state data table 320, the gaming system modifies the player's estimated emotional state data by increasing the magnitude component of the player's estimated emotional state data by 3 in the positive direction, resulting in the estimated emotional state data component of the player's estimated emotional state data representing a positive estimated emotional state and the magnitude component of the player's estimated emotional state data representing a magnitude of 4.

As shown in expected emotional response data table 330, a designated event occurs at time $T_3$. Specifically, at time $T_3$, the player achieves a losing outcome for a play of a primary game. In this example, as shown in expected emotional response data table 330, the achievement of a losing outcome for a play of the primary game is associated with expected emotional response data having: (a) an expected emotional response data component representing a negative expected emotional response, and (b) a magnitude component representing a magnitude of 1. As shown in graph 310 and estimated emotional state data table 320, the gaming system modifies the player's estimated emotional state data by increasing the magnitude component of the player's estimated emotional state data by 1 in the negative direction, resulting in the estimated emotional state data component of the player's estimated emotional state data representing a positive estimated emotional state and the magnitude component of the player's estimated emotional state data representing a magnitude of 3.

As shown in expected emotional response data table 330, a designated event occurs at time $T_4$. Specifically, at time $T_4$, the player achieves a winning outcome for a play of a primary game. As shown in graph 310 and estimated emotional state data table 320, the gaming system modifies the player's estimated emotional state data by increasing the magnitude component of the player's estimated emotional state data by 1 in the positive direction, resulting in the estimated emotional state data component of the player's estimated emotional state data representing a positive estimated emotional state and the magnitude component of the player's estimated emotional state data representing a magnitude of 4.

As shown in expected emotional response data table 330, a designated event occurs at time $T_5$. Specifically, at time $T_5$, the gaming system has been inactive for at least ten consecutive seconds (i.e., there has not been any player activity for ten consecutive seconds). In this example, as shown in expected emotional response data table 330, passing of ten consecutive seconds during which the gaming system is inactive is associated with expected emotional response data having: (a) an expected emotional response data component representing a neutral expected emotional response, and (b) a magnitude component representing a magnitude of 1. As shown in graph 310 and estimated emotional state data table 320, the gaming system modifies the player's estimated emotional state data by increasing the magnitude component of the player's estimated emotional state data by 1 towards a neutral emotional state. In this instance, since the player's current estimated emotional state is positive, the gaming system modifies the player's estimated emotional state by increasing the magnitude component of the player's estimated emotional state data by 1 in the negative direction (i.e., toward neutral), resulting in the estimated emotional state data component of the player's estimated emotional state data representing a positive estimated emotional state and the magnitude component of the player's estimated emotional state data representing a magnitude of 3.

As shown in expected emotional response data table 330, a designated event occurs at time $T_6$. Specifically, at time $T_6$, the gaming system determines that a bonus event has not been triggered within two minutes of initiation of the gaming session. In this example, as shown in expected emotional response data table 330, the passing of two minutes from the initiation of the gaming session during which the bonus game was not triggered is associated with expected emotional response data having: (a) an expected emotional response data component representing a negative expected emotional response, and (b) a magnitude component representing a magnitude of 3. As shown in graph 310 and estimated emotional state data table 320, the gaming system modifies the player's estimated emotional state data by increasing the magnitude component of the player's estimated emotional state data by 3 in the negative direction, resulting in the estimated emotional state data component of the player's estimated emotional state data representing a neutral estimated emotional state and the magnitude component of the player's estimated emotional state data representing a magnitude of 0.

As shown in expected emotional response data table 330, a designated event occurs at time $T_7$. Specifically, at time $T_7$, the player achieves a losing outcome for a play of a primary game. In this example, as shown in expected emotional response data table 330, the achievement of a losing outcome for a play of the primary game is associated with expected emotional response data having: (a) an expected emotional response data component representing a negative expected emotional response, and (b) a magnitude component representing a magnitude of 1. As shown in graph 310 and estimated emotional state data table 320, the gaming system modifies the player's estimated emotional state data by increasing the magnitude component of the player's estimated emotional state data by 1 in the negative direction, resulting in the estimated emotional state data component of the player's estimated emotional state data representing a negative estimated emotional state and the magnitude component of the player's estimated emotional state data representing a magnitude of 1.

Figure 4:
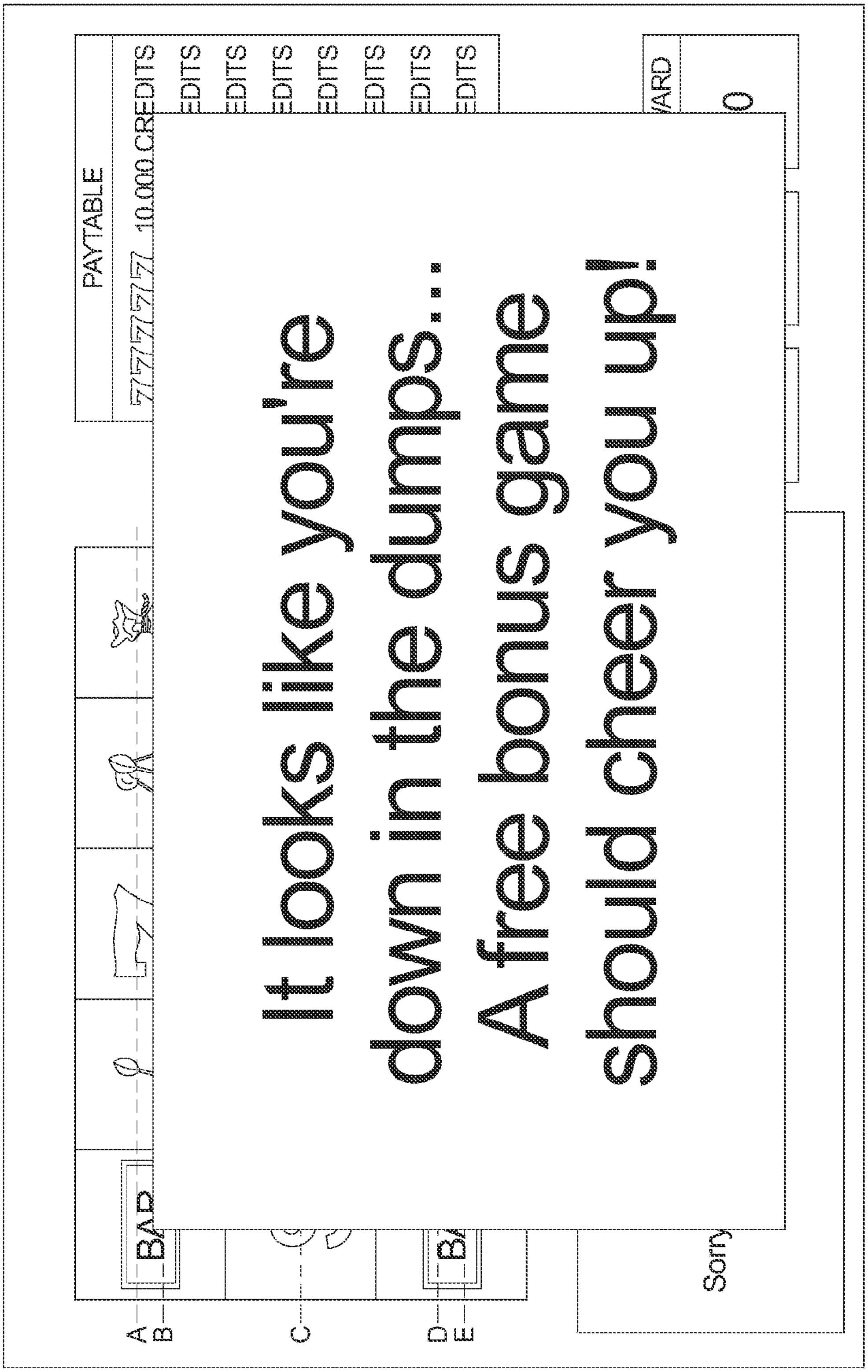
FIG. 4 illustrates a screen shot of one example embodiment of the gaming system of the present disclosure following the satisfaction of a triggering condition that, when satisfied, causes the gaming system to provide a player a play of a bonus game.

In this example, a triggering condition is satisfied when the estimated emotional state data component of the player's estimated emotional state changes from positive to negative or from neutral to negative. Upon the satisfaction of this triggering condition, the gaming system provides the player with a free play of a bonus game. Here, at time $T_7$, the estimated emotional state data component of the player's estimated emotional state changes from neutral to negative. In response the gaming system provides the player with a play of a bonus game. FIG. 4 illustrates an example of this embodiment in which the gaming system notifies the player that the gaming system will provide the player with a free play of the bonus game.

As shown in expected emotional response data table 330, a designated event occurs at time $T_8$. Specifically, at time $T_8$, the free play of the bonus game is initiated. In this example, as shown in expected emotional response data table 330, the initiation of a play of the bonus game is associated with expected emotional response data having: (a) an expected emotional response data component representing a positive expected emotional response, and (b) a magnitude component representing a magnitude of 5. As shown in graph 310 and estimated emotional state data table 320, the gaming system modifies the player's estimated emotional state data by increasing the magnitude component of the player's estimated emotional state data by 1 in the negative direction, resulting in the estimated emotional state data component of the player's estimated emotional state data representing a positive estimated emotional state and the magnitude component of the player's estimated emotional state data representing a magnitude of 4.

As shown in expected emotional response data table 330, a designated event occurs at time $T_9$. Specifically, at time $T_9$, the player achieves a minimum award for a play of the secondary game. In this example, as shown in expected emotional response data table 330, the achievement of a minimum award in a play of the secondary game is associated with expected emotional response data having: (a) an expected emotional response data component representing a negative expected emotional response, and (b) a magnitude component representing a magnitude of 1. As shown in graph 310 and estimated emotional state data table 320, the gaming system modifies the player's estimated emotional state data by increasing the magnitude component of the player's estimated emotional state data by 1 in the negative direction, resulting in the estimated emotional state data component of the player's estimated emotional state data representing a positive estimated emotional state and the magnitude component of the player's estimated emotional state data representing a magnitude of 3.

As shown in expected emotional response data table 330, a designated event occurs at time $T_{10}$. Specifically, at time $T_{10}$, the gaming system provides the player with a progressive award. In this example, as shown in expected emotional response data table 330, providing the player with the progressive award is associated with expected emotional response data having: (a) an expected emotional response data component representing a positive expected emotional response, and (b) a magnitude component representing a magnitude of 10. As shown in graph 310 and estimated emotional state data table 320, the gaming system modifies the player's estimated emotional state data by increasing the magnitude component of the player's estimated emotional state data by 10 in the positive direction, resulting in the estimated emotional state data component of the player's estimated emotional state data representing a positive estimated emotional state and the magnitude component of the player's estimated emotional state data representing a magnitude of 13.

In this example, a triggering condition is satisfied when: (a) the estimated emotional state data component of the player's estimated emotional state data represents a positive estimated emotional state, and (b) the magnitude component of the player's estimated emotional state data reaches a magnitude of 10. Upon the satisfaction of the triggering condition, the gaming system displays a celebration animation and outputs a celebration audio segment. Here, at time $T_{10}$ the estimated emotional state data component represents a positive estimated emotional state and the magnitude component reaches 10. In response, the gaming system displays a celebration animation to the player and outputs a celebration audio segment.

Figure 5:
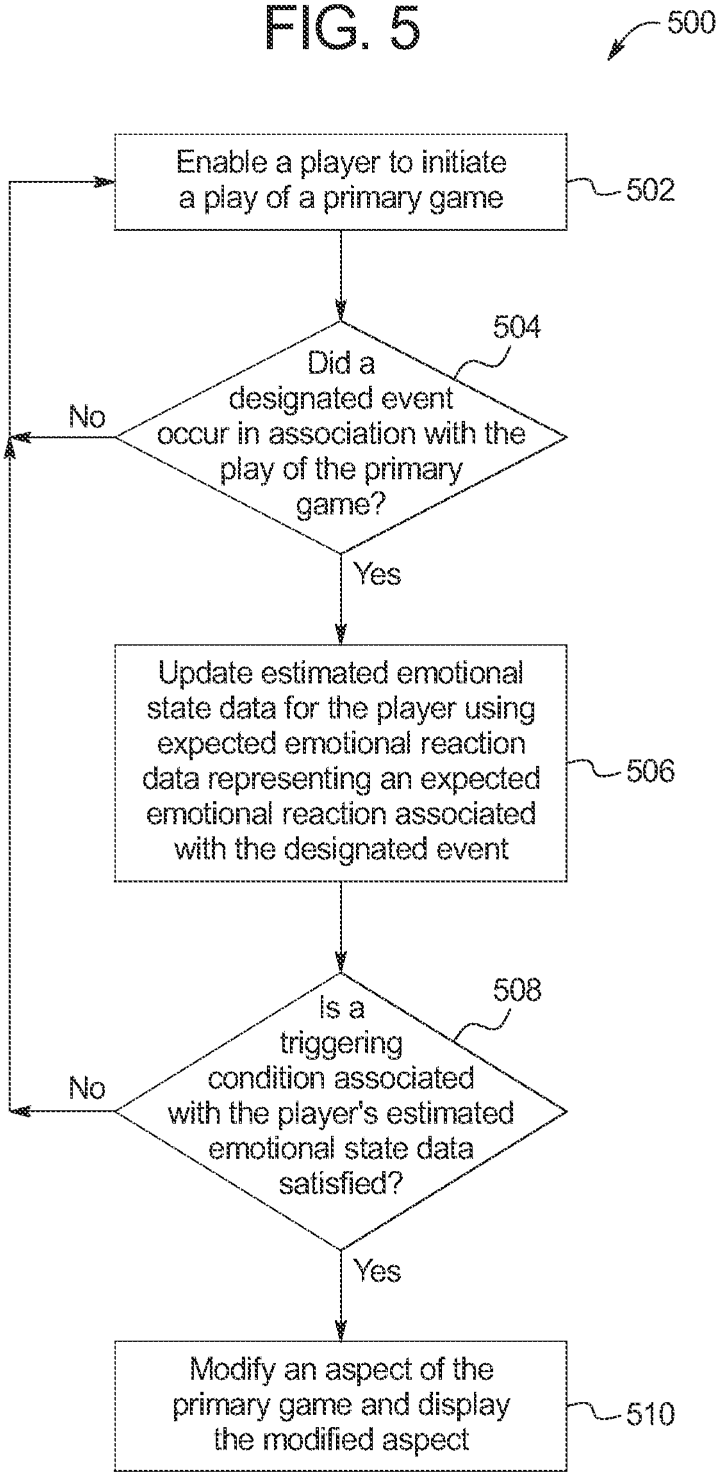
FIG. 5 is a flowchart illustrating an example method of operating a gaming system of one embodiment of the present disclosure.

FIG. 5 illustrates a flowchart of an example of a process or method 500 for operating a gaming system of the present disclosure. In one embodiment, this process 500 is represented by a set of instructions stored in one or more memories and executed by one or more processors or controllers. Although this process 500 is described with reference to the flowchart shown in FIG. 5, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system enables a player to initiate a play of a primary game, as indicated by block 502. The gaming system determines whether a designated event occurred in association with the play of the primary game, as indicated by diamond 504. The designated event is associated with an expected emotional reaction represented by expected emotional reaction data. If the gaming system determines that the designated event did not occur in association with the play of the primary game, process 500 returns to block 502. If the gaming system determines that the designated event occurred in association with the play of the primary game, the gaming system updates estimated emotional state data for the player using the expected emotional reaction data, as indicated by block 506.

The gaming system determines whether a triggering condition associated with the player's estimated emotional state data is satisfied, as indicated by diamond 508. If the gaming system determines that the triggering condition is not satisfied, process 500 returns to block 502. If the gaming system determines that the triggering condition is satisfied, the gaming system modifies an aspect of the primary game and displays the modified aspect, as indicated by block 510.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one processor;

at least one display device;

at least one input device; and at least one memory device storing a plurality of instructions which, when executed by the at least one processor, cause the at least one processor to operate with the at least one display device and the at least one input device to:

(a) determine first estimated emotional state data for a player, the player's first estimated emotional state data representing a first estimated emotional state of the player;

(b) determine whether at least one of one or more designated events occurs in association with one or more plays of at least one of a primary game and a secondary game, each of the one or more designated events being associated with one of a plurality of expected emotional reactions;

(c) for each of the one or more designated events, for each occurrence of said designated event, modify the player's estimated emotional state data using expected emotional reaction data representing the expected emotional reaction associated with said designated event such that the player's modified estimated emotional state data represents a current estimated emotional state of the player;

(d) determine whether one of one or more triggering conditions associated with the player's current estimated emotional state is satisfied; and (e) if one of the triggering conditions is satisfied, modify an aspect of at least one of the primary game and the secondary game and display said modified aspect.

2. The gaming system of claim 1, wherein the player's estimated emotional state data includes at least: (a) an estimated emotional state data component representing one of a positive, a neutral, and a negative estimated emotional state; and (b) a magnitude component representing a magnitude greater than or equal to zero.

3. The gaming system of claim 2, wherein the plurality of instructions, when executed by the at least one processor, cause the at least one processor to, upon initiation of a gaming session, set the player's first estimated emotional state data such that: (a) the estimated emotional state data component represents the neutral estimated emotional state, and (b) the magnitude component represents a magnitude of zero.

4. The gaming system of claim 1, wherein the expected emotional reaction data includes at least: (a) an expected emotional reaction data component representing one of a positive, a neutral, and a negative expected emotional reaction; and (b) a magnitude component representing a magnitude greater than or equal to zero.

5. The gaming system of claim 1, wherein at least one of the designated events is selected from the group consisting of: (a) an initiation of a play of the secondary game; (b) an achievement of a winning outcome for a play of the primary game; (c) an achievement of a losing outcome for a play of the primary game; and (d) the player winning an award of at least a designated amount.

6. The gaming system of claim 1, wherein at least one of the triggering conditions is selected from the group consisting of: (a) an estimated emotional state data component of the player's estimated emotional state data changing from representing a negative estimated emotional state to representing a positive estimated emotional state; (b) the estimated emotional state data component changing from representing the positive estimated emotional state to representing the negative estimated emotional state; and (c) a magnitude component of the player's estimated emotional state data reaching a designated magnitude.

7. A method of operating a gaming system, said method comprising:

(a) causing at least one processor to execute a plurality of instructions stored in at least one memory device to determine first estimated emotional state data for a player, the player's first estimated emotional state data representing a first estimated emotional state of the player;

(b) causing the at least one processor to execute the plurality of instructions to determine whether at least one of one or more designated events occurs in association with one or more plays of at least one of a primary game and a secondary game, each of the one or more designated events being associated with one of a plurality of expected emotional reactions;

(c) causing the at least one processor to execute the plurality of instructions to, for each of the one or more designated events, for each occurrence of said designated event, modify the player's estimated emotional state data using expected emotional reaction data representing the expected emotional reaction associated with said designated event such that the player's modified estimated emotional state data represents a current estimated emotional state of the player;

(d) causing the at least one processor to execute the plurality of instructions to determine whether one of one or more triggering conditions associated with the player's current estimated emotional state is satisfied; and (e) causing the at least one processor to execute the plurality of instructions to, if one of the triggering conditions is satisfied, modify an aspect of at least one of the primary game and the secondary game and operate with at least one display device to display said modified aspect.

8. The method of claim 7, wherein the player's estimated emotional state data includes at least: (a) an estimated emotional state data component representing one of a positive, a neutral, and a negative estimated emotional state; and (b) a magnitude component representing a magnitude greater than or equal to zero.

9. The method of claim 8, which includes causing the at least one processor to execute the plurality of instructions to, upon initiation of a gaming session, set the player's first estimated emotional state data such that: (a) the estimated emotional state data component represents the neutral estimated emotional state, and (b) the magnitude component represents a magnitude of zero.

10. The method of claim 7 wherein the expected emotional reaction data includes at least: (a) an expected emotional reaction data component representing one of a positive, a neutral, and a negative expected emotional reaction; and (b) a magnitude component representing a magnitude greater than or equal to zero.

11. The method of claim 7, wherein at least one of the designated events is selected from the group consisting of: (a) an initiation of a play of the secondary game; (b) an achievement of a winning outcome for a play of the primary game; (c) an achievement of a losing outcome for a play of the primary game; and (d) the player winning an award of at least a designated amount.

12. The method of claim 7, wherein at least one of the triggering conditions is selected from the group consisting of: (a) an estimated emotional state data component of the player's estimated emotional state data changing from representing a negative estimated emotional state to representing a positive estimated emotional state; (b) the estimated emotional state data component changing from representing the positive estimated emotional state to representing the negative estimated emotional state; and (c) a magnitude component of the player's estimated emotional state data reaching a designated magnitude.

13. The method of claim 7, which is provided through a data network.

14. The method of claim 13, wherein the data network is an internet.

15. A non-transitory computer readable medium including a plurality of instructions which, when executed by at least one processor, cause the at least one processor to:

(a) determine first estimated emotional state data for a player, the player's first estimated emotional state data representing a first estimated emotional state of the player;

(b) determine whether at least one of one or more designated events occurs in association with one or more plays of at least one of a primary game and a secondary game, each of the one or more designated events being associated with one of a plurality of expected emotional reactions;

(c) for each of the one or more designated events, for each occurrence of said designated event, modify the player's estimated emotional state data using expected emotional reaction data representing the expected emotional reaction associated with said designated event such that the player's modified estimated emotional state data represents a current estimated emotional state of the player;

(d) determine whether one of one or more triggering conditions associated with the player's current estimated emotional state is satisfied; and (e) if one of the triggering conditions is satisfied, modify an aspect of at least one of the primary game and the secondary game and cause at least one display device to display said modified aspect.

16. The non-transitory computer readable medium of claim 15 wherein the player's estimated emotional state data includes at least: (a) an estimated emotional state data component representing one of a positive, a neutral, and a negative estimated emotional state; and (b) a magnitude component representing a magnitude greater than or equal to zero.

17. The non-transitory computer readable medium of claim 16, wherein the plurality of instructions, when executed by the at least one processor, cause the at least one processor to, upon initiation of a gaming session, set the player's first estimated emotional state data such that: (a) the estimated emotional state data component represents the neutral estimated emotional state, and (b) the magnitude component represents a magnitude of zero.

18. The non-transitory computer readable medium of claim 15, wherein the expected emotional reaction data includes at least: (a) an expected emotional reaction data component representing one of a positive, a neutral, and a negative expected emotional reaction; and (b) a magnitude component representing a magnitude greater than or equal to zero.

19. The non-transitory computer readable medium of claim 15, wherein at least one of the designated events is selected from the group consisting of: (a) an initiation of a play of the secondary game; (b) an achievement of a winning outcome for a play of the primary game; (c) an achievement of a losing outcome for a play of the primary game; and (d) the player winning an award of at least a designated amount.

20. The non-transitory computer readable medium of claim 15, wherein at least one of the triggering conditions is selected from the group consisting of: (a) an estimated emotional state data component of the player's estimated emotional state data changing from representing a negative estimated emotional state to representing a positive estimated emotional state; (b) the estimated emotional state data component changing from representing the positive estimated emotional state to representing the negative estimated emotional state; and (c) a magnitude component of the player's estimated emotional state data reaching a designated magnitude.

* * * * *

UNITED STATES PATENT AND TRADEMARK OFFICE

CERTIFICATE OF CORRECTION

PATENT NO. : 8,460,090 B1
APPLICATION NO. : 13/354709
DATED : June 11, 2013
INVENTOR(S) : Sean M. Gilliland It is certified that error appears in the above-identified patent and that said Letters Patent is hereby corrected as shown below:

IN THE CLAIMS

In Claim 1, Column 32, Line 52, between “the” and “triggering” insert --one or more--.
In Claim 5, Column 33, Lines 7 and 8, between “the” and “designated” insert --one or more--.
In Claim 6, Column 33, Lines 14 and 15, between “the” and “triggering” insert --one or more--.
In Claim 7, Column 33, Line 54, between “the” and “triggering” insert --one or more--.
In Claim 11, Column 34, Lines 10 and 11, between “the” and “designated” insert --one or more--.
In Claim 12, Column 34, Lines 17 and 18, between “the” and “triggering” insert --one or more--.
In Claim 15, Column 34, Line 55, between “the” and “triggering” insert --one or more--.
In Claim 19, Column 35, Line 13, between “the” and “designated” insert --one or more--.
In Claim 20, Column 35, Line 20, between “the” and “triggering” insert --one or more--.

Signed and Sealed this
Eleventh Day of March, 2014

Michelle K. Lee

Michelle K. Lee
*Deputy Director of the United States Patent and Trademark Office*